US006569486B2

(12) United States Patent
Cirkel-Egner et al.

(10) Patent No.: US 6,569,486 B2
(45) Date of Patent: May 27, 2003

(54) MACCHIATO COFFEE CONCENTRATE SYSTEM

(75) Inventors: Charlotte Cirkel-Egner, Frankfurt (DE); Hanspeter Maier, Mörfelden-Walldorf (DE)

(73) Assignee: Nestec S.A., Vevey (CH)

( * ) Notice: Subject to any disclaimer, the term of this patent is extended or adjusted under 35 U.S.C. 154(b) by 151 days.

(21) Appl. No.: 09/795,963

(22) Filed: Feb. 28, 2001

(65) Prior Publication Data

US 2001/0019735 A1 Sep. 6, 2001

(30) Foreign Application Priority Data

Mar. 2, 2000 (EP) .............................. 00104336

(51) Int. Cl.[7] .......................... A23F 5/00; A23C 17/00; A23C 1/187; A23C 9/16
(52) U.S. Cl. ...................... 426/594; 426/580; 426/583; 426/585; 426/587; 426/588; 426/386; 426/595
(58) Field of Search ................................ 426/594, 580, 426/583, 585, 587, 588, 386, 595

(56) References Cited

U.S. PATENT DOCUMENTS

| | | | |
|---|---|---|---|
| 3,823,241 A | 7/1974 | Patel et al. ................. 426/386 |
| 4,232,502 A | 11/1980 | Lucas ......................... 53/453 |
| 4,746,527 A | 5/1988 | Kuypers ..................... 426/569 |
| 4,748,040 A | 5/1988 | Kuypers ..................... 426/569 |
| 5,030,473 A | 7/1991 | Ghodsizadeh ............... 426/650 |
| 5,087,469 A | 2/1992 | Acree ......................... 426/544 |
| 5,182,926 A | 2/1993 | Carns et al. .................. 62/352 |
| 5,222,364 A | 6/1993 | Carns et al. .................. 62/15 |
| 5,780,092 A | 7/1998 | Agbo et al. ................. 426/569 |
| 5,836,479 A | 11/1998 | Klima et al. ............... 222/83.5 |
| 5,897,903 A | 4/1999 | Gerhard-Rieben et al. .. 426/433 |
| 5,922,384 A | * 7/1999 | Blackwell et al. | |
| 5,928,703 A | * 7/1999 | Chmiel et al. | |
| 5,997,929 A | 12/1999 | Heeb et al. ................. 426/433 |
| 5,997,936 A | 12/1999 | Jimenez-Laguna .......... 426/565 |
| 6,054,162 A | 4/2000 | Bradbury et al. ........ 426/330.3 |
| 6,093,436 A | 7/2000 | Zheng et al. ............... 426/541 |
| 6,129,943 A | 10/2000 | Zeller et al. ................ 426/564 |
| 6,149,957 A | 11/2000 | Mandralis et al. .......... 426/387 |

FOREIGN PATENT DOCUMENTS

| | | |
|---|---|---|
| EP | 0 154 192 A1 | 2/1985 |
| EP | 0 826 308 A1 | 3/1998 |
| EP | 0 861 595 A1 | 9/1998 |
| EP | 0 861 596 A1 | 9/1998 |
| EP | 0 885 566 A1 | 12/1998 |
| EP | 0 893 065 A2 | 1/1999 |
| EP | 0 916 226 A1 | 5/1999 |
| EP | 0 916 267 A2 | 5/1999 |
| EP | 0934702 | 8/1999 |
| WO | WO 96/08153 | 3/1996 |
| WO | WO99/52378 | 10/1999 |
| WO | WO 00/44238 | 8/2000 |

* cited by examiner

*Primary Examiner*—Anthony J. Weier
(74) *Attorney, Agent, or Firm*—Winston & Strawn

(57) ABSTRACT

A beverage system for providing a coffee beverage is described which contains a coffee base concentrate and an aromatized soluble coffee creamer. The coffee base concentrate has a soluble coffee solids concentration of at least about 10% by weight and is free of coffee aroma. The coffee base concentrate and the aromatized soluble coffee aroma are stored separately and are combined upon reconstitution for providing a coffee beverage. Separate storage of the coffee base concentrate and the aromatized soluble coffee creamer increases the stability of the system and provides a coffee beverage which closely assimilates a freshly brewed coffee drinks such as latte macchiato and cappuccino.

18 Claims, No Drawings

MACCHIATO COFFEE CONCENTRATE SYSTEM

FIELD OF THE INVENTION

This invention relates to a beverage system for providing a coffee beverage comprising a stable coffee concentrate which may be reconstituted with water and an aromatized creamer to provide an aromatized coffee beverage. The invention especially relates to a beverage system for providing a coffee beverage having foam on its surface known as Italian latte coffee such as cappuccino and macchiato coffee. The invention also relates to an apparatus and a method for providing the beverage system. Further the invention relates to a method for preparing Italian latte coffee.

BACKGROUND OF THE INVENTION

Soluble coffee beverage products of the instant "cappuccino" type are well known and are commercially available. Usually these products are a dry mix of a soluble coffee powder and a soluble whitener powder. The soluble whitener powder contains pockets of gas, which, upon dissolution of the powder, produce foam. Cappuccino compositions of the above-discussed types are described in U.S. Pat. Nos. 4,746,527 and 4,748,040, as well as European Patent Application 0154192, PCT Patent Application WO96/08153, and U.S. Pat. No. 6,129,943. Therefore, upon the addition of water (usually hot), a whitened coffee beverage, which has a foam on its upper surface, is formed; the beverage resembling, to a greater or lesser extent, traditional Italian cappuccino.

Coffee products in the form of soluble beverage powders may be of extremely high quality to the point were they provide a beverage very similar to freshly brewed beverages. Despite this, they are still perceived as being inferior to freshly brewed coffee. Also, the fact that soluble beverage powders are in powder form creates problems in many food service applications where the product is dispensed from a machine. In particular, problems such as mechanical degradation of the powder, and bridging or blocking due to moisture pickup occur. Other problems are known to occur in obtaining an acceptable beverage with little or no lumps upon dissolution.

Ready-to-drink liquid coffee beverages are very popular in Asian markets. The beverages are made up of soluble coffee solids, stabilizers, water and, usually, sugar. For whitened beverages, a creamer or whitener may be included. Ordinarily, these beverages have a soluble coffee solids concentration of about 1% by weight. These beverages are very often consumed cold and, in general, have organoleptic properties which differ from freshly brewed coffee. Therefore they do not, and in fact are not intended to, provide a substitute to freshly brewed coffee. The ready-to-drink liquid coffee is therefore little suitable for making cappuccino and macchiato type coffee.

There have also been attempts to provide convenient coffee products in concentrate form. In theory, a coffee concentrate offers the advantages of being perceived to have better quality than soluble beverage powders, and being simple to apply in food service applications. Unfortunately, coffee concentrates are mostly unstable and this has severely limited their application. One problem appears to be the increase of acidity over time which negatively influences the quality of the beverage reconstituted from the coffee concentrate. This increased acidity can cause curdling of later added whitener or creamer components.

Attempts have been made to avoid or reduce the acidity increase by adding caustic base to the concentrate. For example, European patent application 0861595 describes treating a coffee concentrate with alkali to convert acid precursors to their acid salts, and then neutralizing the treated concentrate with acid to bring the pH to about 4.7 to 5.3. This process is described to convert the acid precursors to stable salts and hence prevent the formation of acid during storage.

Another possible method of avoiding or reducing the acidity increase in aromatized coffee concentrates is to increase the coffee concentration to above about 55%. This is described in European patent application 0893065.

While these processes provide some improvement of the storage stability of the coffee concentrates, quality deterioration still occurs. Therefore, there is still a need for a stable coffee concentrate.

U.S. Pat. No. 5,997,936 describes a product including a beverage-forming component and a frozen milk concentrate component, wherein the frozen milk concentrate component incorporates a gas therein at an overrun of at least 150%, with the components constituting distinct separate portions of the product and being present in amounts sufficient to form a beverage having a foamed milk topping thereon after addition of a liquid to the product and melting of the frozen milk concentrate component. The beverage-forming component can be coffee in the form of soluble coffee or a frozen coffee liquor. In a dispensing machine, this would require an apparatus to provide the necessary freezing capability, thus making the dispensing device more complex.

To provide a beverage of the cappuccino and macchiato type coffee there is a need for an alternative to the above beverage powders. Furthermore, there is a need for an alternative beverage system for providing cappuccino and macchiato type coffee which is based on a coffee concentrate. The present invention now satisfies these needs.

SUMMARY OF THE INVENTION

Accordingly, this invention provides a beverage system for providing a coffee beverage. The beverage system includes a coffee base concentrate having a soluble coffee solids concentration of at least 10% by weight and from which coffee aroma has been removed; and an aromatized soluble creamer powder separate from the coffee base concentrate. The coffee base concentrate and soluble creamer powder are combinable and upon reconstitution with water provide a coffee beverage.

It has been surprisingly found that separation of the coffee base concentrate and coffee aroma, and incorporating the coffee aroma in the soluble coffee creamer significantly improves stability of the concentrate. The soluble coffee creamer incorporating the coffee aroma has a good aroma potential, which has been found to provide a more complete aroma profile of the final product. In particular, it has been found that a beverage system with a soluble coffee creamer incorporating aqueous aroma components provides a product, which assimilates a freshly brewed roast and ground coffee combined with a milk beverage.

It has also surprisingly been found that with an aromatized soluble creamer powder containing gas for foaming the beverage system provides a coffee beverage which closely resembles a cappuccino or macchiato type coffee. The coffee base concentrate and aromatized soluble coffee creamer may be each stored in a separate container or may be stored in separate compartments of a single container. The containers are preferably dispenser containers. For reconstitution of the beverage, the aromatized soluble creamer is preferably mixed with a hot liquid to provide a foamed aromatized milk beverage, the concentrate is combined with the aromatized milk beverage to provide a coffee beverage of cappuccino or macchiato style coffee. This provides a beverage that has an aroma profile, which assimilates that of cappuccino or macchiato style coffee.

In another embodiment, this invention provides a beverage system for providing a coffee beverage, the beverage system including a container that has: a first storage compartment containing a coffee base concentrate having a soluble coffee solids concentration of at least 10% by weight and from which coffee aroma has been removed, and a second storage compartment containing aromatized soluble coffee creamer powder.

Advantageously, these storage compartments are admixed with a liquid upon reconstitution of the beverage. In one embodiment, the aromatized creamer powder is reconstituted with the liquid, and then the reconstituted coffee creamer is combined with the coffee base concentrate.

In a further embodiment, the invention provides a method for providing a coffee beverage. The method includes providing a separately stored coffee base concentrate having a solid concentration of about 15% to about 45% by weight and from which coffee aroma has been removed; providing a separately stored aromatized soluble coffee creamer powder; reconstituting the aromatized soluble coffee creamer by combining it with a liquid; and combining the reconstituted coffee creamer with the coffee base concentrate.

DETAILED DESCRIPTION OF THE PREFERRED EMBODIMENTS

The invention is based upon the finding that the separate storage of concentrated soluble coffee solids and coffee aroma significantly improves the stability of the concentrated soluble coffee solids, and that the incorporation of the coffee aroma in the coffee creamer, advantageously a soluble coffee creamer powder, may be done in a manner so that a stable soluble coffee creamer may be obtained which provides a complementary aroma. Therefore, by separately storing the coffee base concentrate and aromatized soluble coffee creamer and recombining them upon reconstitution, a coffee beverage of good quality may be provided.

The coffee base concentrate may be obtained using any suitable procedure since the exact procedure used is not critical. Usually, the coffee base concentrate is prepared by concentrating a coffee extract obtained from a coffee extraction process to the desired coffee concentration. The coffee extract may be produced in the usual manner by subjecting roasted coffee beans prior to extraction. Any suitable extraction procedure may be used because the choice and design of the extraction procedure is a matter of preference and has no critical impact on the invention. Suitable extraction procedures are described in European patent applications 0826308 and 0916267 as well as U.S. Pat. Nos. 5,897,903 and 5,997,929. Similarly, any suitable concentration procedure may be used because the choice and design of the concentration procedure is a matter of preference and has no critical impact on the invention. Of course, the coffee base concentrate may also be prepared by dissolving soluble coffee powder in water to the desired concentration.

The concentration of the coffee base concentrate is at least about 10% to as high as desired. Generally, the upper level is about 65–75% by weight with the range of concentration preferably being between about 15% to about 45% by weight.

The coffee base concentrate may be treated to account for or reduce the formation of acids during storage. To account for the formation of acids during storage, the pH of the coffee base concentrate may be raised to a pH in the range from about 5.5 to about 6.5. The pH will still fall during storage but the coffee base concentrate will not become too acidic during acceptable shelf life times. The pH may be raised using any suitable procedure. For example, an alkali may be added to the coffee base concentrate to raise the pH. Suitable alkalis include sodium hydroxide, calcium hydroxide, potassium hydroxide and sodium bicarbonate. Alternatively, the pH may be raised using ion exchange. This offers the advantage that no additives are added to the coffee base concentrate.

The formation of acids may be reduced or prevented by inducing hydrolysis of the acid precursors in the coffee base concentrate. This may be done by raising the pH to cause the acid precursors to form stable salts and then reducing the pH of the concentrate. This may be done by adding alkali as described in European patent application 0861596 and U.S. Pat. No. 6,054,162 or by using ion exchange. Usually the pH will be raised to above about 9. The pH may again be lowered to a normal coffee pH range using suitable acids or ion exchange. Alternatively, the acid precursors may be thermally hydrolyzed or enzymatically hydrolyzed, such as by using an esterase or hydrolase.

The formation of acids may also be reduced or prevented by removing acid precursors from the coffee base concentrate using membrane fractionation. Suitable membranes are commercially available for this purpose.

It is also possible to add an alkali to the base coffee concentrate at the time of reconstitution of the beverage. This may be done by dispensing an alkali along with the base coffee concentrate.

In a preferred embodiment of the invention, the coffee base concentrate should be substantially free of coffee aroma. Merely processing the roasted coffee beans to a coffee base concentrate as described above will result in the loss of substantially all coffee aroma. Therefore, it is preferred to specifically strip off and then collect the coffee aroma during processing. In this way, the coffee aroma is not lost. Processes for stripping off and collecting the coffee aroma are well known. Usually coffee aroma is stripped off at one or more stages; for example:

using an inert gas or steam during, or immediately after, grinding of the coffee beans, and using steam to strip coffee aroma from the coffee extract during extraction.

Alternatively, the fresh coffee grounds may be slurried in water or coffee extract and the coffee aroma stripped from the slurry. A suitable procedure is described in International patent application PCT/EP99/00747 and U.S. Pat. No. 6,149,957.

The coffee aroma may be captured using any suitable procedure. Ordinarily, the coffee aroma is captured by condensing from the carrier gas it in one or more condensers. Preferably more than one condenser is used; each succeeding condenser being operated at a lower temperature than the previous condenser. If necessary or desired, one of the condensers may be a cryogenic aroma condenser. A suitable cryogenic aroma condenser is described in U.S. Pat. No. 5,182,926. The captured coffee aroma may, if desired, be concentrated using a suitable technique such as partial condensation or rectification. The captured coffee aroma may be combined with a suitable carrier substrate such as coffee oil or emulsion containing coffee oil or other fats.

Aqueous coffee aroma components and organic coffee aroma components are then separated. A suitable method for separating aqueous coffee aroma components from organic coffee aroma components is described in European patent application 99200241.0.

The processes for the production of the coffee extract and capture of the coffee aroma may be carried out under oxygen reduced or oxygen free conditions if desired. This may be accomplished as is known in the art; for example by carrying out the processes under a blanket of inert gas. Further, deoxygenated water may preferably be used whenever water is necessary in the process.

The coffee aroma is preferably stored under oxygen-reduced or oxygen-free conditions and frozen. Similarly, the coffee base concentrate may be stored under oxygen-reduced or oxygen-free conditions. Further, if desired, oxygen scavengers may be added to the coffee aroma and/or coffee base concentrate. Suitable oxygen scavengers are described in European patent application 99200185.9 and U.S. Pat. No. 6,093,436.

To the beverage system according to the invention it has been found that it is particular advantageous to prepare the "milk" part of the beverage on the basis of a soluble creamer powder. Soluble creamer powders are well known and are widely used; particularly as coffee or tea creamers. Conventionally creamer powders contain protein, fats, and sweeteners, and other ingredients such as emulsifiers, stabilizers, and buffers, may also be included. Further, the creamers come in various forms such as milk-based creamer powders, non-dairy creamer powders, and gassed creamer powders. These creamer powders are typically produced by subjecting a solution containing their components to spray drying.

For the present beverage system it has been found to be advantageous to provide an aromatized creamer powder. A particular suitable soluble creamer may include a matrix including proteins, fats, and carbohydrates, and an aroma system, the aroma system comprising aqueous coffee aroma components and a stabilizing amount of soluble coffee solids. The creamer powder preferably contains about 0.05% to about 1.0% by weight of aqueous coffee aroma components; more preferably about 0.1% to about 0.3% by weight. The creamer powder may contain about 0.01% to about 0.1% by weight of soluble coffee solids in the aroma system. It has been found that a creamer of this type is particularly suitable for the beverage system of the invention as it provides together with the coffee concentrate an aroma and flavor profile which approximates that of a freshly brewed cappuccino or macchiato.

Preferably the aqueous coffee aroma components include highly volatile aqueous aroma components which condense at temperatures less than about 0° C.

The creamer powder may be gassed for forming foam upon reconstitution. This is desirable if the beverage system of the invention is to be used for preparing a cappuccino or macchiato type coffee. Further, the creamer powder may further comprise an organic aroma substrate containing organic coffee aroma components.

The soluble creamer powder may be prepared as follows: The coffee aroma components are cryogenically collected as describe above. Aqueous coffee aroma components and organic coffee aroma components are then separated. Soluble coffee solids are added to the aqueous coffee aroma components to provide an aqueous aroma solution. The aqueous aroma solution is then added to a creamer concentrate, which contains proteins, fats, and carbohydrates to provide an aromatized solution. Finally the aromatized solution is dried to powder. More details of the process are given below.

The aqueous coffee aroma components are natural aroma components, which may be collected during the preparation of soluble coffee powder. This may be done by standard procedures for collecting coffee aroma components or by suitably modifying the standard procedures. Preferably, the natural aroma components include highly volatile aroma components. Highly volatile aroma components are those which condense at a temperature below about 0° C.

To collect highly volatile aroma components, the standard procedures usually entail flushing volatile aroma components from the coffee during processing using an inert carrier gas such as nitrogen. The aroma-laden carrier gas is then chilled to temperatures lower than about −40° C., and sometimes as low as about −195° C., to cause the aroma components to condense. The condensed aroma components are then collected. The condensed aroma components are then usually absorbed into an aroma substrate, usually an oil. Alternatively, the aromas may be absorbed into the aroma substrate during condensation. Suitable standard procedures are disclosed in, for example, U.S. Pat. Nos. 3,823,241, 5,030,473, and 5,222,364.

In the standard procedures described above, the aromatized aroma substrate obtained contains both aqueous and organic aroma components. In general, the aqueous components are removed and often discarded because they are unstable in normal applications and cause instability problems. This leaves the aroma substrate containing substantially only organic aroma components. Instead of discarding the aqueous components, however, the present invention collects these components in the form of an aqueous aroma solution. The aqueous aroma solution is then added to the other components making up the creamer powder prior to drying of the components. Sufficient aqueous aroma solution may be added such that the aqueous coffee aroma components comprise about 0.05% to about 0.5% by weight of the creamer powder; for example about 0.1% to about 0.3%. In one embodiment, the aromatized soluble creamer powder comprises about 0.05% to about 1.0% by weight of aqueous coffee aroma components. The soluble coffee solids comprise about 0.01% to about 0.1% by weight of the creamer powder.

The remaining components of the creamer powder may be those which are conventionally utilized in these type products. Ordinarily, the remaining components include proteins, fats, and carbohydrates forming sweeteners or bulking agents. The amounts of these components may vary depending upon the desired characteristics of the creamer powder.

For example, the creamer powder may contain about 15% to about 60% by weight of non-fat milk solids; about 5% to about 20% by weight of sweet whey; about 5% to about 30% by weight of a suitable edible oil or fat such as coconut oil, and about 20% to about 70% by weight a suitable food grade sweetener. Suitable sweeteners include carbohydrates such as glucose syrup, corn syrup, sucrose, dextrose, fructose, maltodextrin, and the like, and mixtures of these carbohydrates. Glucose syrup is particularly suitable, especially syrups having a DE in the range of about 35 to about 42. An example of such a creamer powder is described in European patent application No 0885566.

For food service applications, the coffee base concentrate and the aromatized soluble coffee creamer may be separately stored in suitable dispenser containers. The containers may be separate for the coffee base concentrate and the soluble coffee creamer or a single container having separate storage chambers may be used. The containers are suitably pouches made from barrier films, which are able to keep water vapor, oxygen and light transmission to a minimum. Suitable barrier films are commercially available; for example polyester/aluminum/polyethylene barrier films.

For retail applications, the coffee base concentrate and the aromatized soluble coffee creamer are preferably packaged in suitable containers which have separate storage chambers for the coffee base concentrate and the soluble coffee creamer. Suitable containers include multi-compartment stick packs; sachets; carton-based, tetrahedron packs; UNIFILL(™) packs; squeezeable plastic bottles; stand up pouches; plastic or aluminum cups; and the like.

EXAMPLES

The following examples describe preferred formulations.

Example 1

Preparation of Coffee Base Concentrate

The coffee concentrate was prepared by concentrating coffee extracts obtained from a coffee extraction process. The extracts were evaporated to a concentration of about 20% dry matter. The aroma was stripped off and collected during the process, and no aroma was lost. The aroma was stripped off by using an inert gas during the grinding of the coffee beans, and also by using steam to strip coffee aroma from the extract during the extraction. The aroma was captured by condensing it from the carrier gas in one or more condensers. Aqueous coffee aroma components and organic cryogenically collected coffee aroma components were then separated. The aqueous aroma was incorporated into the soluble creamer powder as described below.

The coffee concentrates were treated to reduce the formation of acids during storage. The coffee concentrates were enzyme treated and the pH was adjusted decrease acidifying during storage. The concentrates were filled into vapor tight 15 ml capsules and sterilized at about f-values of more than 5.

Different coffee varieties are used. For example, capsules were prepared with pure Arabica coffee base concentrate.

Example 2

Preparation of Aromatized Soluble Creamer Powder

Aromatized soluble creamer powders were prepared by adding the aqueous aroma to a creamer concentrate, which contains proteins, fats, and carbohydrates, to provide an aromatized solution. The aromatized solution was spray dried to powder.

Soluble creamer powders are prepared from 20% to 60% non-fat milk solids, 0% to 40% carbohydrates, 10% to 30% milk fat or vegetable oil, 0% to 15% sugar, and up to 1% coffee aroma contained as an emulsion or aqueous solution in a dried wet mix.

Further soluble creamer powders are prepared wherein the aqueous coffee aroma components and solid coffee solids are mixed together and the mixture is added to the other ingredients before these are spray dried.

To obtain a foaming soluble creamer powder nitrogen was injected before spray drying at about 0.1 to about 0.3 liters/kg of creamer concentrate. This gives a tapped specific gravity (density) of the powder of between about 150 g/l to about 250 g/l. Tapped specific gravity is referring to the specific gravity of the powder when compressed by vibrating the powder with 100 pushes of 10 mm.

Example 3

Coffee Base Concentrate Shelf Life

Plastic film capsules were filled with about 10 ml of coffee base concentrate prepared according with example 1 with a soluble coffee solids concentration of 10%, 20%, 30%, and 40% by weight. The capsules were closed with aluminum film and ultra high temperature (UHT) treated at 138° C. for 5 seconds. The cup quality was checked every month in a Cappuccino preparation over 12 months, and the beverage was found good without significant deterioration over that time.

Coffee base concentrates containing volatile aqueous aroma were UHT treated and filled into a TETRAPACK(™) container. Gelification was checked after 12 months storage time, but no gelification was found. Parallel samples without added aroma gelified when stored for the same time.

Coffee base concentrates with a soluble coffee solids concentration of 10% by weight were given an enzyme treatment by hydrolase at about 45° C. for 1 hour. The enzymes were inactivated afterwards. A total of 40% carbohydrates were added by means of sucrose. Fatty esters addition provides a mild pasteurization. The coffee base concentrate was filled into plastic film cups and closed with aluminum film. The cup quality is checked after 6 months shelf life and found to be good and the product safe.

Example 4

Aromatized Soluble Creamer Powder Shelf Life

Aromatized soluble creamer powder according to example 2 was packed in sachets and stored. The stability was checked every month. It was found that the creamer powder is stable for at least 6 months. Further it was found that soluble creamers with added soluble coffee solids were stable for at least 18 months.

Foaming aromatized soluble creamer powder according to example 2 were filled into aluminum film sachets, gassed, and stored at ambient conditions. After 12 months the creamer powder was found to be stable and as good as a fresh sample.

Example 5

Preparation of Beverages

A coffee base concentrate having a soluble coffee solids concentration of 20% by weight prepared according to example 1 and an aromatized soluble creamer powder prepared according to example 2 were combined.

To prepare a "latte macchiato" 12 g of the 20% soluble solid concentration coffee base concentrate and 13 g of the aromatized creamer were provided. The reconstitution was done by mixing the 13 g of aromatized creamer with 150 ml of hot water in a glass to provide a "milk" beverage with foam on the surface. The 12 g coffee base concentrate was then added on top of the milk foam. The result was a coffee beverage which closely approximates an Italian "latte macchiato".

To prepare a Cappuccino, 12 g of the 20% soluble solid concentration coffee base concentrate and 8 g of the aromatized creamer were provided. The reconstitution was done by mixing the 8 g aromatized creamer with 120 ml hot water in a glass to provide a "milk" beverage with foam on the surface. The coffee base concentrate was poured into a cup and the foamed milk beverage is poured onto the base concentrate. The coffee base concentrate may also be poured onto the milk beverage, however, this left black dots on the beverage foam.

The quality of fresh prepared Cappuccinos and latte macchiatos out of high pressure Espresso machines with milk foaming device was compared with the coffee beverage made according to the invention. Without aroma addition in the soluble coffee creamer powder the coffee impression in the preparation was more flat and more milky than the Espresso machine products. With added aroma in the soluble coffee creamer powder the cup was more balanced, the cooked notes of the liquid coffee and the creamer powder were masked, and beverage was found to closely resemble the freshly prepared cups. In some cases the tasting panel had difficulties distinguishing the fresh prepared beverage from those made according to the invention.

The invention described and claimed herein is not strictly limited in scope by the specific embodiments disclosed herein, since these embodiments are intended as illustrations of preferred aspects of the invention. Indeed, various modifications of the invention in addition to those shown and described herein will become apparent to those skilled in the art from the foregoing description. Such modifications and any equivalents thereof are intended to be within the scope of the appended claims. Furthermore, to the extent necessary to understand or embody the invention claimed herein, the appropriate disclosures of the prior art documents referred to herein are expressly incorporated by reference.

What is claimed is:

1. A beverage system for providing a coffee beverage, the beverage system comprising: a coffee base concentrate having a soluble coffee solids concentration of about 10 to about 75% by weight and from which coffee aroma has been removed; and an aromatized soluble creamer powder separate from the coffee base concentrate; wherein the coffee base concentrate and soluble creamer powder are combinable upon reconstitution for providing a coffee beverage.

2. The beverage system of claim 1 wherein the coffee base concentrate has a soluble coffee solids concentration of about 15% to about 45% by weight.

3. The beverage system of claim 1 wherein the coffee base concentrate is treated or processed to reduce acid precursors therein to thus reduce formation of acidity during storage.

4. The beverage system of claim 1 wherein the aromatized soluble creamer powder incorporates a gas for foaming so as to provide a foamed creamer beverage upon constitution.

5. The beverage system of claim 1 wherein the aromatized soluble creamer powder comprises an aroma system comprising aqueous coffee aroma component.

6. The beverage system of claim 1 wherein the aromatized soluble creamer powder comprises about 0.05% to about 1.0% by weight of aqueous coffee aroma components.

7. The beverage system of claim 1 wherein the aromatized soluble creamer powder comprises about 0.1% to about 0.3% by weight of aqueous coffee aroma components and about 0.01% to about 0.1% by weight of soluble coffee solids.

8. The beverage system of claim 1 wherein the aromatized soluble creamer powder comprises about 0.01% to about 0.1% by weight of soluble coffee solids.

9. The beverage system of claim 6 wherein the aromatized soluble creamer powder comprises about 15% to about 60% by weight of non-fat milk solids; about 5% to about 20% by weight of sweet whey; about 5% to about 30% by weight of an edible oil or fat, and about 20% to about 70% by weight a suitable food grade sweetener.

10. The beverage system of claim 6 wherein the aromatized soluble creamer powder comprises about 20% to about 60% by weight of non-fat milk solids; about 10% to about 30% by weight of milk fat, vegetable oil, or a mixture thereof; and, optionally, carbohydrates in an amount of as high as about 40% by weight and sugar in an amount of as high as about 15% by weight.

11. The beverage system of claim 1 wherein the coffee base concentrate and aromatized soluble coffee creamer are each retained and stored in a separate dispenser containers.

12. The beverage system of claim 11 wherein each container comprises a pouch comprising a barrier film.

13. A beverage system for providing a coffee beverage, the beverage system comprising a container including:

a first storage compartment containing a coffee base concentrate having a soluble coffee solids concentration of at least 10% to 75% by weight and from which coffee aroma has been removed; and a second storage compartment containing aromatized soluble coffee creamer powder.

14. An aromatized soluble creamer powder comprising about 0.05% to about 1.0% by weight of aqueous-coffee-aroma components.

15. The aromatized soluble creamer powder of claim 14 wherein the aromatized soluble creamer powder comprises about 0.1% to about 0.3% by weight of aqueous coffee aroma components and further comprising about 0.01% to about 0.1% by weight of soluble coffee solids.

16. The aromatized soluble creamer powder of claim 14 further comprising about 15% to about 60% by weight of non-fat milk solids; about 5% to about 20% by weight of sweet whey; about 5% to about 30% by weight of an edible oil or fat, and about 20% to about 70% by weight of a suitable food grade sweetener.

17. The aromatized soluble creamer powder of claim 14 wherein the creamer is a foaming creamer with a tapped specific gravity of between about 150 to about 250 grams per liter.

18. The aromatized soluble creamer powder of claim 14 further comprising about 20% to about 60% by weight of non-fat milk solids; about 10% to about 30% by weight of milk fat, vegetable oil, or a mixture thereof; and, optionally, carbohydrates in an amount of as high as about 40% by weight and sugar in an amount of as high as about 15% by weight.

* * * * *